United States Patent
Hayakawa

(10) Patent No.: US 7,551,402 B2
(45) Date of Patent: Jun. 23, 2009

(54) MAGNETIC DISK DRIVE AND RAMP

(75) Inventor: Takako Hayakawa, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 413 days.

(21) Appl. No.: 11/415,585

(22) Filed: May 1, 2006

(65) Prior Publication Data

US 2006/0256478 A1 Nov. 16, 2006

(30) Foreign Application Priority Data

May 10, 2005 (JP) ............................. 2005-136964

(51) Int. Cl.
G11B 21/22 (2006.01)
(52) U.S. Cl. .................................. 360/254.7
(58) Field of Classification Search .............. 360/254.7, 360/97.02, 128
See application file for complete search history.

(56) References Cited

U.S. PATENT DOCUMENTS

| | | | |
|---|---|---|---|
| 5,898,545 A | | 4/1999 | Schirle |
| 6,084,753 A | * | 7/2000 | Gillis et al. .................. 360/128 |
| 6,600,625 B1 | | 7/2003 | Munninghoff et al. |
| 6,628,475 B2 | | 9/2003 | Nakamoto et al. |
| 7,268,972 B2 | * | 9/2007 | Akama et al. ............ 360/97.02 |
| 2002/0015255 A1 | * | 2/2002 | Tadepalli et al. .......... 360/97.02 |
| 2002/0071202 A1 | | 6/2002 | Myokan et al. |
| 2002/0071203 A1 | * | 6/2002 | Nakamoto et al. ........ 360/97.02 |
| 2002/0196581 A1 | * | 12/2002 | Tsang et al. ............. 360/97.02 |
| 2003/0151847 A1 | | 8/2003 | Tsang et al. |
| 2005/0219739 A1 | * | 10/2005 | Alt et al. .................. 360/97.02 |

FOREIGN PATENT DOCUMENTS

| | | |
|---|---|---|
| JP | 06-084313 A | 3/1994 |
| JP | 2001-101814 | 4/2001 |
| JP | 2004-079021 | 3/2004 |

* cited by examiner

*Primary Examiner*—Tianjie Chen
(74) *Attorney, Agent, or Firm*—Townsend and Townsend and Crew LLP; Patrick Duncan

(57) ABSTRACT

Embodiments of the invention provide a magnetic disk drive that can effectively suppress the influence of an air stream coupled with the rotation of a magnetic disk. In one embodiment, the magnetic disk drive is adapted to have a disk assembly that includes at least one magnetic disk medium, a head assembly that includes at least one magnetic head which writes magnetic signals onto and reads them out from the magnetic disk medium or media, and at least one arm which supports the magnetic head(s), a ramp assembly that includes at least one ramp which guides the magnetic head(s) to a required retreat position(s) when the particular magnetic head is moved away from the associated magnetic disk medium, and shroud fins as many in number as the magnetic disk media, in which case, each shroud fin is disposed integrally with the ramp assembly and in association with and next to either of the magnetic disk media in order to guide an air stream produced by the rotation of the disk assembly.

10 Claims, 4 Drawing Sheets

MAGNETIC DISK DRIVE AND RAMP

CROSS-REFERENCES TO RELATED APPLICATIONS

This application claims priority from Japanese Patent Application No. JP2005-136964, filed May 10, 2005, the entire disclosure of which is incorporated herein by reference.

BACKGROUND OF THE INVENTION

The present invention relates to magnetic disk drives, and more particularly, to a ramp for storing a magnetic head.

The types of operation schemes of magnetic disk drives such as hard-disk drives include the so-called load/unload scheme. In this scheme, the magnetic disk drive glides a magnetic head to a position above a desired sector on the magnetic disk when conducting a process such as writing data onto a magnetic disk or reading out data therefrom, and moves the magnetic head away from the magnetic disk when not conducting the process.

The magnetic disk drives employing the load/unload scheme to have a ramp along which the magnetic drive guides the magnetic head to a required retreat position when moving the head away from the disk.

In such a magnetic disk drive, however, high-speed rotation of the magnetic disk causes a stream of air, which affects the positioning accuracy of the magnetic head over the magnetic disk.

In order to control the air stream caused by the rotation of the magnetic disk, therefore; a shroud, for instance, for covering the perimeter of the magnetic disk is provided in a conventional magnetic disk drive (e.g., the disk drive described in Patent Document 1, Japanese Patent Laid-open No. 2002-184154).

BRIEF SUMMARY OF THE INVENTION

In the conventional magnetic disk drive mentioned above, however, since the shroud is provided as an element independent of a ramp, a break in the shroud at a ramp causes a disturbance in the air stream, coupled with the rotation of the magnetic disk, thus leading to vibration of the actuator that supports the magnetic head. Also, the absence of a shroud at the ramp means that the air stream is most likely to be disturbed near the magnetic head. That is to say, in addition to the vibration of the actuator, the shroud structure described above has caused the vibration of the suspension which supports the magnetic head, resulting in reduced positioning accuracy of the magnetic head.

The present invention was made with the above problems in view, and it is a feature of the invention to provide a magnetic disk drive that can effectively suppress the influence of an air stream coupled with the rotation of a magnetic disk.

A magnetic disk drive according to an aspect of the present invention for solving the above problems has: a disk assembly including at least one magnetic disk medium; a head assembly that includes at least one magnetic head which writes magnetic signals onto and reads them out from the magnetic disk medium or media, and at least one arm which supports the magnetic head(s); a ramp assembly that includes at least one ramp which guides the magnetic head(s) to a required retreat position(s) when the particular magnetic head is moved away from the associated magnetic disk medium; and shroud fins as many in number as the magnetic disk media, each shroud fin being disposed integrally with the ramp assembly and in association with, and next to, either of the magnetic disk media in order to guide an air stream produced by the rotation of the disk assembly.

DETAILED DESCRIPTION OF THE INVENTION

Figure 1:
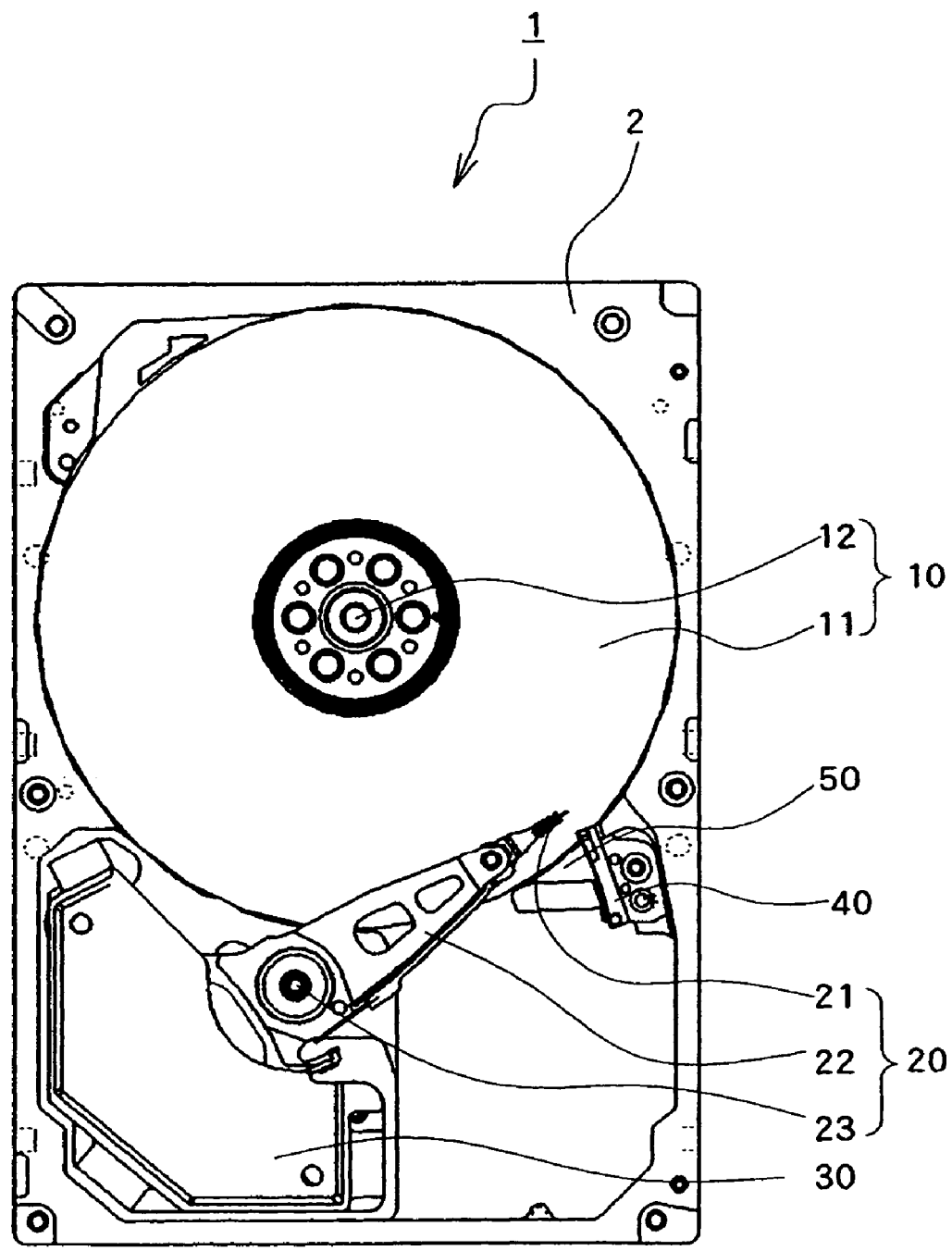
FIG. 1 is a top view showing major constituent elements of a magnetic disk drive according to an embodiment of the present invention.

A magnetic disk drive according to an embodiment of the present invention will be described below with reference to the accompanying drawings. FIG. 1 is a top view that shows major constituent elements of the magnetic disk drive of the present embodiment.

As shown in FIG. 1, various members of magnetic disk drive 1 are installed in or on a base 2 which is part of an enclosure. During mounting, a cover not shown is installed over the base 2 to hermetically seal the enclosure.

The magnetic disk drive 1 has a disk assembly 10 that includes at least one magnetic disk medium 11 onto which data will be written, and the disk assembly is pivotally held by a spindle motor 12.

A case in which the disk assembly 10 has two magnetic disk media 11 in the present embodiment is taken as an example in the description thereof. Hereinafter, when the two magnetic disk media 11 included in the disk assembly 10 are to be called distinctly, the upper of the two magnetic disk media 11 and the lower thereof (i.e., the disk medium closer to the base 2) are called a first disk 11a and a second disk 11b, respectively.

The magnetic disk drive 1 also has a head assembly 20. The head assembly 20 includes one or more sets each consisting of a magnetic head 21 which flies over a particular magnetic disk medium 11 to write magnetic signals onto the surface of the disk medium and to read out written magnetic signals therefrom, and an arm 22 that supports the magnetic head 21. In this case, the number of sets each consisting of one magnetic head 21 and one arm 22 is equal to the number of magnetic signal recording surfaces of the magnetic disk media 11 included in the disk assembly 10. Also, the head assembly 20 is held so that it can be pivoted about a pivot axis 23 by a voice coil motor 30.

In the present embodiment, the head assembly 20 includes four sets of magnetic heads 21 and arms 22 so that data can be written onto upper and lower faces of both the first disk 11a and second disk 11b included in the disk assembly 10.

Also, the magnetic disk drive 1 employs the so-called load/unload scheme as a method of conducting magnetic signal read/write processes on each magnetic disk medium 11. That is, when conducting these processes to write data onto the magnetic disk medium 11 or read out written data therefrom, the magnetic disk drive 1 glides a magnetic head 21 to a position above a desired sector on the magnetic signal read/write surface of the magnetic disk medium. When not conducting the above processes, the magnetic disk drive 1 pivots the head assembly 20 to move the magnetic head 21 away from the surface of the magnetic disk medium.

Accordingly, the magnetic disk drive 1 has a ramp assembly 40 that includes ramps as many in number as the magnetic heads 21 included in the head assembly 20 (in the present embodiment, 4 heads). Each of the ramps guides a corresponding magnetic head 21 to a required retreat position during unloading for retreating the magnetic head from the disk surface.

The magnetic disk drive I also has a shroud 50 formed integrally with the ramp assembly 40 to guide an air stream generated inside the enclosure of the magnetic disk drive 1 by rotation of the disk assembly 10.

In short, the magnetic disk drive 1 has the ramp assembly 40 formed integrally with the shroud 50. Next, the ramp assembly 40 having the shroud 50 will be described in detail.

Figure 2:
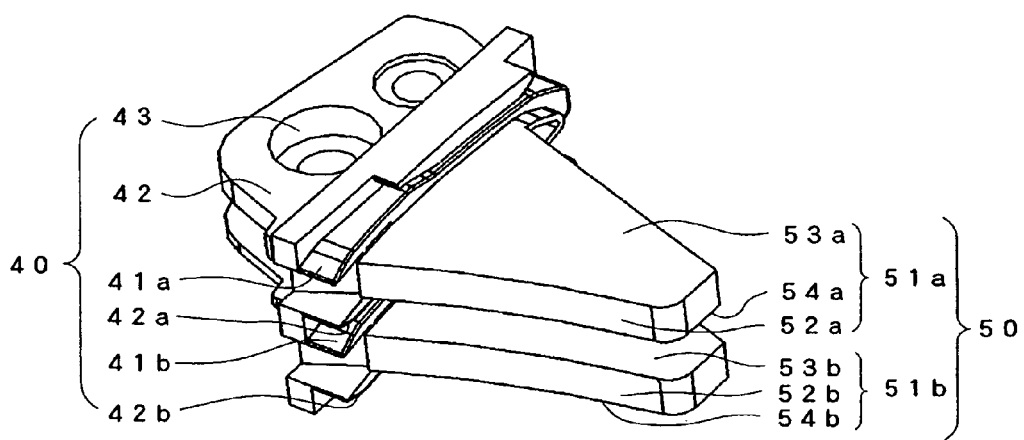
FIG. 2 is a perspective view showing an example of a ramp assembly and shroud according to the embodiment of the present invention.
Figure 3:
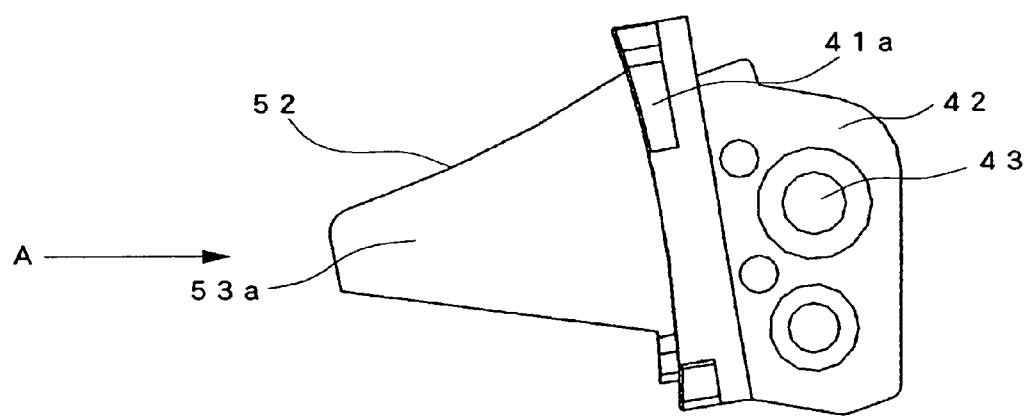
FIG. 3 is a top view showing the above example of a ramp assembly and shroud according to the embodiment of the present invention.
Figure 4:
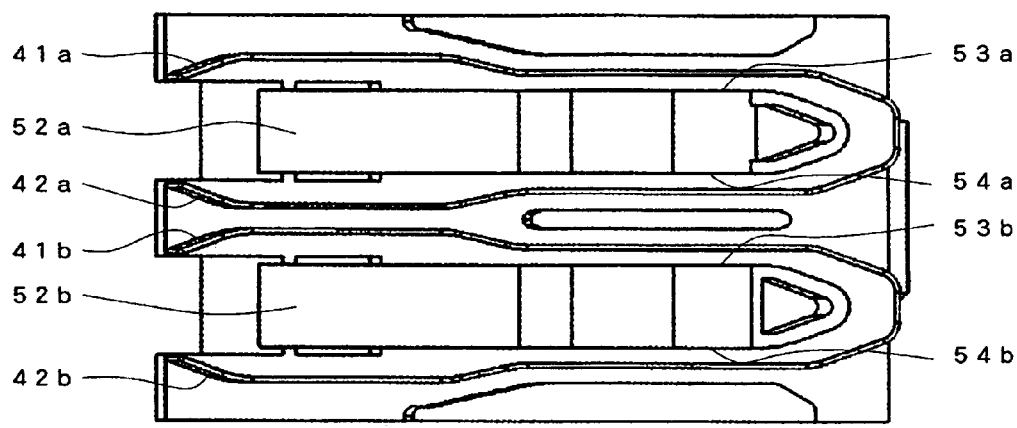
FIG. 4 is a side view taken from the direction of arrow A in FIG. 3 in order to show the above example of a ramp assembly and shroud according to the embodiment of the present invention.

FIGS. 2, 3, and 4 are a perspective view, a top view, and a side view, respectively, of the ramp assembly 40. FIG. 4 is a side view of the ramp assembly when it is seen from a direction of arrow A in FIG. 3.

As shown in FIGS. 2 to 4, the ramp assembly 40 has proximal portions 42 as many in number as the magnetic heads 21 (in the present embodiment, 4 heads) included in the head assembly 20. Each proximal portion 42 has a screw hole 43 into which a screw for fixing the base 2 to the ramp assembly 40 is to be inserted. The ramp assembly 40 also has ramps 41a and 42a as many in number as the magnetic heads 21. Each of the ramps 41a, 42a guides each magnetic head 21 to the required retreat position during unloading.

In the embodiment shown, the ramp assembly 40 has four ramps. A first upper ramp 41a guides a magnetic head 21 associated with the upper face of the first disk 11a, and a first lower ramp 42a guides a magnetic head 21 associated with the lower face of the first disk 11a. Also, a second upper ramp 41b guides a magnetic head 21 associated with the upper face of the second disk 11b, and a second lower ramp 42b guides a magnetic head 21 associated with the lower face of the second disk 11b.

The shroud 50 that includes shroud fins 51 (in the present embodiment, 2 fins) as many in number as the magnetic disks 11 included in the disk assembly 10. Each shroud fin formed as a plate-shaped member to extend from the proximal portion 42, and disposed in association with and next to either of the magnetic disk media 11, is also formed integrally with the ramp assembly 40.

More specifically, the shroud 50 has two shroud fins. A first shroud fin 51a extends from an interstice between the first upper ramp 41a and the first lower ramp 42a, and is disposed at the position facing, and next to, the first disk 11a. A second shroud fin 51b extends from an interstice between the second upper ramp 41b and the second lower ramp 42b, and is disposed at the position facing, and next to the second disk 11b.

Each shroud fin 51 has a disk-facing lateral face 52 formed as a curved face extending from the proximal portion 42 of the ramp assembly 40. The lateral face 52 has a required length along a portion of a lateral face of the magnetic disk medium 11 which faces the shroud fin, and is approximately equal to the above-mentioned lateral face of the magnetic disk medium 11 in terms of height (i.e., thickness of the magnetic disk medium 11).

Each disk-facing lateral face 52 is opposed to a lateral face of an associated magnetic disk medium 11 at required intervals so that each shroud fin 51 can function as a shroud to guide the air stream generated by the rotation of the disk assembly 10.

More specifically, the first shroud fin 51a has a first disk-facing lateral face 52a. The lateral face 52a extends over a required length of space from the interstice between the first upper ramp 41a and the first lower ramp 42a, with a height approximately equal to that of a lateral face of the first disk 11a and a radius of curvature approximately equal to that of the lateral face of the first disk 11a, and opposed to the lateral face of the first disk 11a of a required length. Similarly, the second shroud fin 51b also has a second disk-facing lateral face 52b opposed to a portion of a lateral face of the second disk 11b.

Also, each shroud fin 51 is formed with a thickness approximately equal to the height of each disk-facing lateral face 52 (i.e., a thickness approximately equal to that of the magnetic disk medium 11 facing the shroud fin).

More specifically, the first shroud fin 51a and the second shroud fin 51b are formed as plate-like members whose thicknesses are approximately equal to those of the first disk 11a and the second disk 11b, respectively.

This means that upper faces 53 and lower faces 54 of the shroud fins 51 parallel to each other are positioned on approximately the same planes as the upper and lower faces, respectively, of the magnetic disk medium 11 facing the shroud fin, namely, positioned approximately on extension lines of the upper and lower faces of the magnetic disk medium 11.

More specifically, an upper face 53a and lower face 54a of the first shroud fin 51a are positioned on approximately the same planes as the upper and lower faces, respectively, of the first disk 11a. Similarly, an upper face 53b and lower face 54b of the second shroud fin 51b are positioned on approximately the same planes as the upper and lower faces, respectively, of the second disk 11b.

Each magnetic head 21 is guided to the associated ramp 41, 42 when the magnetic head 21 is moved away from the surface of the associated magnetic disk medium 11 by pivotal movement of the head assembly 20. In that case, the arm 22 that supports the magnetic head 21 moves along the shroud fin 51 opposed to the magnetic disk medium 11 associated with the magnetic head 21.

More specifically, when either magnetic head 21 for writing magnetic signals onto or reading them out from the upper face of the first disk 11a is moved onto the first upper ramp 41a, the arm 22 that supports the particular magnetic head 21 moves along the upper face 53a of the first shroud fin 51a.

Also, when the magnetic head 21 associated with the lower face of the first disk 11a is moved onto the first lower ramp 42a, the arm 22 that supports the particular magnetic head 21 moves along the lower face 54a of the first shroud fin 51a, i.e., between the lower face 54a and the upper face 53b of the second shroud fin 51b.

Likewise, the arm 22 that supports the magnetic head 21 associated with the upper face of the second disk 11b moves between the first shroud fin 51a and the second shroud fin 51b, and the arm 22 that supports the magnetic head 21 associated with the lower face of the second disk 11b moves underneath the second disk 11b.

As can be seen from the above, the shroud 50 is formed with the slits that function as spaces in which, when the arm 22 that supports the particular magnetic head 21 of the head assembly 20 moves, that magnetic head 21 is moved away from the associated disk surface. Also, when the magnetic head 21 is in a stopped state on the associated ramp 41, 42, the arm 22 that supports the magnetic head 21 is positioned.

In other words, the shroud 50 is of the structure having a notched region in which each arm 22 of the head assembly 20 is positioned at least during unloading.

The magnetic disk drive 1 according to the present invention is not limited to the above-described embodiment. That is to say, for example, each shroud fin 51 provided in the ramp assembly may have a tapered region 55 reduced in thickness as the shroud fin extends in a direction opposite to that of the magnetic disk medium 11 from a neighboring portion of the disk-facing lateral face 52.

Figure 5:
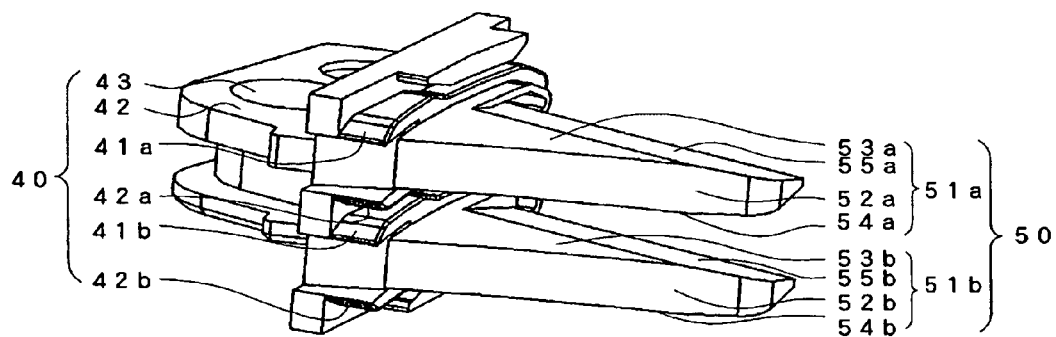
FIG. 5 is a perspective view showing another example of a ramp assembly and shroud according to the embodiment of the present invention.
Figure 6:
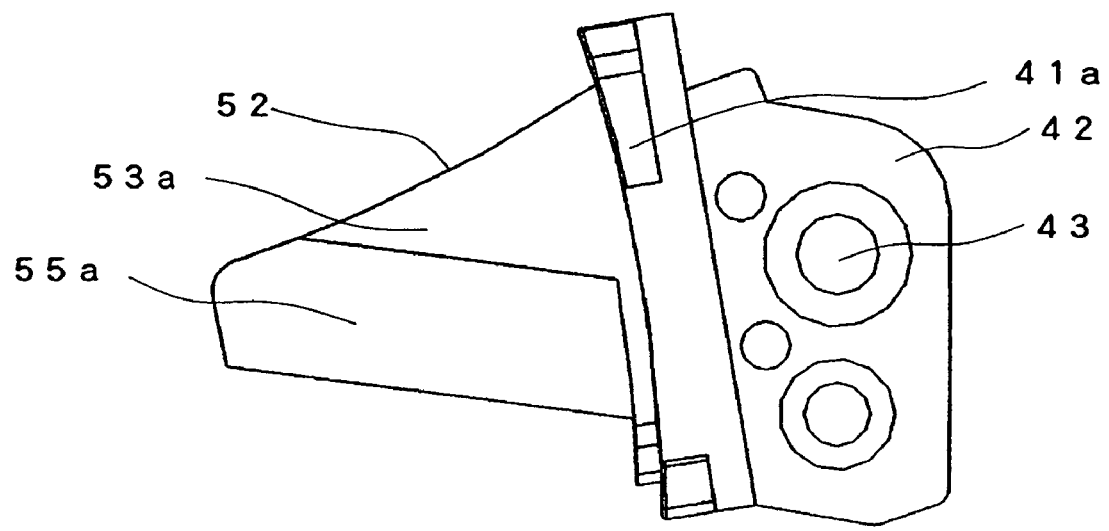
FIG. 6 is a top view of the ramp assembly and shroud in the example of FIG. 5 according to the embodiment of the present invention.

More specifically, a perspective view and top view of the ramp assembly 40 in this example are shown in FIGS. 5 and 6, respectively.

In the example of FIGS. 5 and 6, the upper face 53 of each shroud fin 51 is formed with a tapered region (55a, 55b) whose downward inclination increases with an increase in a distance from at least a portion of the tapered region to the disk-facing lateral face 52 approximately equal to the magnetic disk medium 11 in terms of thickness.

The shroud 50 that guides the air stream generated by the rotation of the disk assembly 10 can be improved in function by providing such a tapered region 55. The tapered region 55 may be formed on the lower face 54 of each shroud fin 51 or may be formed on both the upper face 53 and the lower face 54.

Also, while the above-described example assumes that the disk assembly 10 includes two magnetic disk media 11, the present invention is not limited by this assumption and the disk assembly 10 may include, for example, one magnetic disk medium 11 or three or more magnetic disk media 11. The number of elements provided in either of these cases, such as magnetic heads 21, arms 22, ramps 41, 42, and shroud fins 51, is equal to the number of magnetic disk media 11 included in the disk assembly 10.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
    a disk assembly including at least one magnetic disk medium;
    a head assembly including at least one magnetic head for writing magnetic signals onto and reading out magnetic signals from said at least one magnetic disk medium, and at least one arm that supports said at least one magnetic head;
    a ramp assembly including at least one ramp which guides said magnetic head to a retreat position when said magnetic head is moved away from said magnetic disk medium; and
    shroud fins as many in number as there actually are said magnetic disk media, each shroud fin being disposed integrally with said ramp assembly and in association with and next to one of said magnetic disk media in order to guide an air stream produced by rotation of said disk assembly,
    wherein each of said shroud fins includes a tapered region reduced in thickness as said shroud fin extends in a direction away from and without covering any part of said magnetic medium associated with said shroud fin.

2. The magnetic disk drive according to claim 1, wherein each of said shroud fins is disposed such that when said magnetic head is guided to the retreat position by said ramp, said at least one arm can be moved along the surface of said shroud fin.

3. The magnetic disk drive according to claim 1, wherein each of said shroud fins extends from said ramp assembly and has a curved surface opposed to, with a spacing from, and next to a lateral face of said magnetic disk medium associated with said shroud fin.

4. The magnetic disk drive according to claim 3, wherein said curved surface has a radius of curvature approximately equal to a radius of curvature of said lateral face of said magnetic disc medium associated with said shroud fin.

5. The magnetic disk drive according to claim 3, wherein each of said shroud fins has a thickness approximately equal to a height of said lateral surface of said magnetic disk medium associated with said shroud fin.

6. The magnetic disk drive according to claim 5, wherein an upper surface of each said shroud fin is positioned on approximately the same plane as an upper surface of said magnetic disk medium associated with said shroud fin, and a lower surface of each said shroud fin is positioned on approximately the same plane as a lower surface of said magnetic disk medium associated with said shroud fin.

7. The magnetic disk drive according to claim 3, wherein each of said shroud fins includes a tapered region reduced in thickness as said shroud fin extends in a direction opposite from a neighboring portion of said lateral face of said magnetic disk medium associated with said shroud fin.

8. The magnetic disk drive according to claim 1, wherein said ramp assembly includes an upper ramp to guide one said magnetic head associated with an upper face of one said magnetic disk medium, and a lower ramp to guide another said magnetic head associated with a lower face of said associated magnetic disk medium.

9. The magnetic disk drive according to claim 8, wherein one of said shroud fins extends from an interstice between said upper ramp and said lower ramp, and is disposed at a position facing, and next to, said associated magnetic disk medium.

10. The magnetic disk drive according to claim 1, wherein said ramp assembly includes proximal portions as many in number as said magnetic heads in the head assembly, and wherein each of said shroud fins extends from one of said proximal portions.

* * * * *